(12) United States Patent  
McCay

(10) Patent No.: US 9,374,984 B2  
(45) Date of Patent: Jun. 28, 2016

(54) ELASTIC DOG LEASH

(76) Inventor: Gary Jeffrey McCay, Brisbane (AU)

( * ) Notice: Subject to any disclaimer, the term of this patent is extended or adjusted under 35 U.S.C. 154(b) by 514 days.

(21) Appl. No.: 12/300,105

(22) PCT Filed: May 8, 2007

(86) PCT No.: PCT/AU2007/000615  
§ 371 (c)(1),  
(2), (4) Date: Apr. 30, 2009

(87) PCT Pub. No.: WO2007/128076  
PCT Pub. Date: Nov. 15, 2007

(65) Prior Publication Data  
US 2009/0320769 A1    Dec. 31, 2009

(30) Foreign Application Priority Data  
May 8, 2006 (AU) ................................ 2006902405

(51) Int. Cl.  
*A01K 27/00* (2006.01)

(52) U.S. Cl.  
CPC ............ *A01K 27/005* (2013.01); *A01K 27/003* (2013.01)

(58) Field of Classification Search  
CPC .... A01K 27/00; A01K 27/003; A01K 27/005  
USPC .................................. 119/792, 793, 795, 798  
See application file for complete search history.

(56) References Cited

U.S. PATENT DOCUMENTS

| | | | | |
|---|---|---|---|---|
| 4,745,883 | A | | 5/1988 | Baggetta .......................... 119/96 |
| 4,777,784 | A | | 10/1988 | Ferguson .......................... 54/34 |
| 4,892,063 | A | * | 1/1990 | Garrigan ........................ 119/795 |
| 5,146,876 | A | * | 9/1992 | McPhail ........................ 119/798 |
| 5,564,476 | A | * | 10/1996 | Golz .............................. 139/388 |
| 5,749,326 | A | | 5/1998 | Jones et al. ................... 119/798 |
| 5,915,336 | A | | 6/1999 | Watson ........................ 119/797 |
| 6,435,137 | B1 | * | 8/2002 | Hourihan ...................... 119/788 |
| 6,467,437 | B2 | * | 10/2002 | Donovan et al. ............. 119/798 |
| 6,694,923 | B1 | | 2/2004 | Fouché ......................... 119/792 |
| 6,729,268 | B1 | * | 5/2004 | Costell ......................... 119/726 |
| 7,293,531 | B2 | * | 11/2007 | Young, III ..................... 119/798 |
| 7,640,895 | B2 | * | 1/2010 | Fountoulakis et al. ....... 119/795 |

FOREIGN PATENT DOCUMENTS

| | | |
|---|---|---|
| CN | 2539396 Y | 3/2003 |
| DE | 20318612 | 11/2004 |
| FR | 9708242 | 12/1998 |
| WO | WO9725859 | 7/1997 |

\* cited by examiner

*Primary Examiner* — David Parsley  
(74) *Attorney, Agent, or Firm* — Fitzpatrick, Cella, Harper & Scinto

(57) ABSTRACT

A dog leash (10) comprising an elastic section (11) having an elliptical section elastic material (12) and an outer braiding (13) whereby the braiding is woven so that it may extend in a limited amount in the direction of the arrow (14) and be limited in that extension by reason of the limitation imposed by the weave on the braiding.

13 Claims, 2 Drawing Sheets

ELASTIC DOG LEASH

FIELD OF THE INVENTION

THIS INVENTION relates to an elastic dog leash and in particular but not limited to an elastic dog leash of the type illustrated in relation to the drawings.

BACKGROUND TO THE INVENTION

Dog leash constructions are manifold in type and form, the most common form involving the use of a collar, a clasp connecting the leash to the collar and an inextensible length of rope or other material from the clasp to a loop handle.

Traditionally, dog handling has involved the combined use of lead in relation to training collars such as the so called "choker chain" and in more recent times, the use of a harness or other mechanism whereby a dog may be retained in fairly rigid relationship to the handler. Leashes include long leashes, short leashes and leashes of intermediate length all of which have varying advantages and disadvantages. The object of a dog handler is to have an obedient dog able to walk with the handler without constraint and be civilised in its relationship with other persons in public places.

One training method utilises the use of a correction collar of the choker chain type whereby the dog responds to corrections applied by the handler through the lead to the correction collar. This is usually initiated with a long lead, then after a period of training a shorter lead is adopted, the objective being to train the dog to walk at heel on a loose lead in public.

The dog, of course, can be taught other commands including sit, down, stay and so forth, but primarily, the principle task of this type of training is to have an obedient dog in public where the handler can be confident that the dog will be well behaved.

One major problem in all these circumstances is that in situations where a dog is to undergo correction due to it running off or otherwise, the inextensible connection between the choker chain and the handler may result in a situation where the final correction involves a "jerking motion" where it can cause injury to the dog and also to the handler particularly in the case of large dogs.

An effort to reduce this there are now available leashes is in the form of spooled leads which are under a certain amount of drag so that the lead is automatically retractable once the dog reaches the end of the lead. Elastic leads are also known in the prior art, one example being in relation to US Patent Application Publication Number 2005/0229868 (YOUNG, III) which describes an elastic lead where a monofilament is held inside a tubular elastic cover, the monofilament limiting the length of extension of the elastic tubing. This arrangement has the object of reducing the amount of stress on both the neck of the dog and the arm and shoulder of the person walking the dog when the dog reaches the maximum of length of the unstretched leash.

This arrangement has the disadvantage that the elastic tubing is on the outside of the lead which means it is relatively easy for a dog to chew through or bite through and, secondly, it does not offer any advantage in terms of aspects related to the training of a dog utilising such lead since its extension and characteristics do not allow a balance between cushioning and application of a timely correction.

Other arrangements employing elastic leads or leads with elastic sections are described in the following patent specifications: DE 20318612 (MEYER); FR 2765071 (HOUZE); U.S. Pat. No. 5,749,326 (JONES et al); U.S. Pat. No. 6,694,923 (FOUCHE); WO 1997/025859 (JACOBSON); U.S. Pat. No. 4,777,784 (FERGUSON); U.S. Pat. No. 5,915,336 (WATSON).

MEYER describes the addition of a short 20 cm length of cotton covered elastic in a standard dog lead to slow the jerking effects of the dog reaching the end of the lead. Thus the effect of the elastic section is minimal in terms of overall extension of a standard 1700 mm-1800 mm long lead. See also U.S. Pat. No. 5,915,336 (WATSON).

HOUZE describes an elastic lead made from cylindrical rubber core and a braided textile cover. The lead is in different diameters from 6-8 mm for different weight dogs. This lead has the same problems as referred to above in relation to YOUNG, III.

JONES et al describes a dog leash that is adapted to curl up so that the leash does not drag on the ground when the dog is close by, rather the lead curls up above the dog thereby avoiding tangling. This arrangement requires a complex relationship between the braid and elastic sections of the lead. This lead also lacks the customary loop down from the choker collar when the dog is in the proper heel position. Due to the curling effect the lead, handler and dog relationship used in customary training is not present. This is a significant disadvantage in terms of the visual cues given to dogs being trained and the key element of the dog being able to see and perceive the downward loop of the lead.

The prior art discussion in JACOBSON illustrates just how crowded the field of the present invention is with 14 pages of prior art discussion. JACOBSON describes a dog leash which is along its major lead section elastic, the inventive element being the construction of the handle.

At the end of the day a dog leash has three basic elements, a length of rope like material with something to connect to the dog collar and something for the handler to hold onto. It is clear from the proliferation of dog leashes including those that employ an elastic part, that for all intents and purposes the art is a very crowded one in the classic sense that the development of anything useful is most probably inventive since in a crowded highly developed art fresh developments are unlikely to be obvious ones. The present invention falls in this category since it brings together the important characteristic of the tried and true in an elastic cord that enhances the use of the standard configuration while providing additional benefits in a training environment.

Accordingly, it is an object of the present invention to provide a cushion effect in a suitable lead while at the same time providing sufficient responsiveness to enable an extensible lead to be utilised to apply suitable correction to a dog attached to the end of the lead.

OUTLINE OF THE INVENTION

In one aspect therefore the present invention resides in an elastic leash for a dog comprising at least in part a substantially flat elastic section covered by a woven web material, the woven web material being woven in such a way as to limit the extension of the elastic section such that upon application of a correction force to a dog attached to the end of the leash, that correction force is cushioned between the user and the dog.

Preferably, the leash has an elastic section from 1500 mm-2000 mm long and more preferably 1500 mm-1800 mm long. The elastic section is about 15 m-20 mm wide and 3 mm-5 mm thick. The elastic section is preferably extensible to about 100%. That is it reaches its limit at twice its normal length.

In one preferred form, the leash includes a loop handle at a distal end nearest the dog or a loop handle at a proximal end nearest the handler. In another preferred form the leash includes a loop handle at a distal end nearest the dog and a second loop handle at a proximal end nearest the handler. Thus the loop nearest the dog may be utilised as a handle and be inextensible for close work. The loop handles are typically both of inextensible material.

Preferably, the elastic cord comprises elliptical cross section shock cord with webbing loops at each end and a standard dog snap lock to make a strong dog leash that allows limited stretch of the leash and thus greatly reducing the strain on both dog and handler.

Preferably, the shape and size of the shock cord combined with a protective braiding and the resilient nature of the rubber inside makes it almost indestructible to dogs. Thus the adoption of a relatively broad flat lead makes it difficult for a dog to chew through the lead or damage the lead in any way compared to smaller round sections where it is easier for a dog to apply maximum force across the small sizes of the lead in order to damage the lead. Thus compared to the above prior art the present invention has the advantage of having a wider section for applied biting force to the lead and secondly, has a protective outer braiding and this is applied over practically the whole leash.

Preferably, the flat shock cord is secured to inextensible webbing forming the handles at each end of the shock cord and this webbing comprises flat webbing simply sewed to the flat surface of the shock cord through the braiding at the handles (see Figures). An advantage of the flat shock cord is that it is simpler and easier to construct in relation to its connection to the flat inextensible webbing.

BRIEF DESCRIPTION OF THE DRAWINGS

In order that the present invention may be more readily put into practical effect, reference will now be made to the accompanying drawings which illustrate a preferred embodiment of the invention and wherein:—

METHOD OF PERFORMANCE

Figure 1:
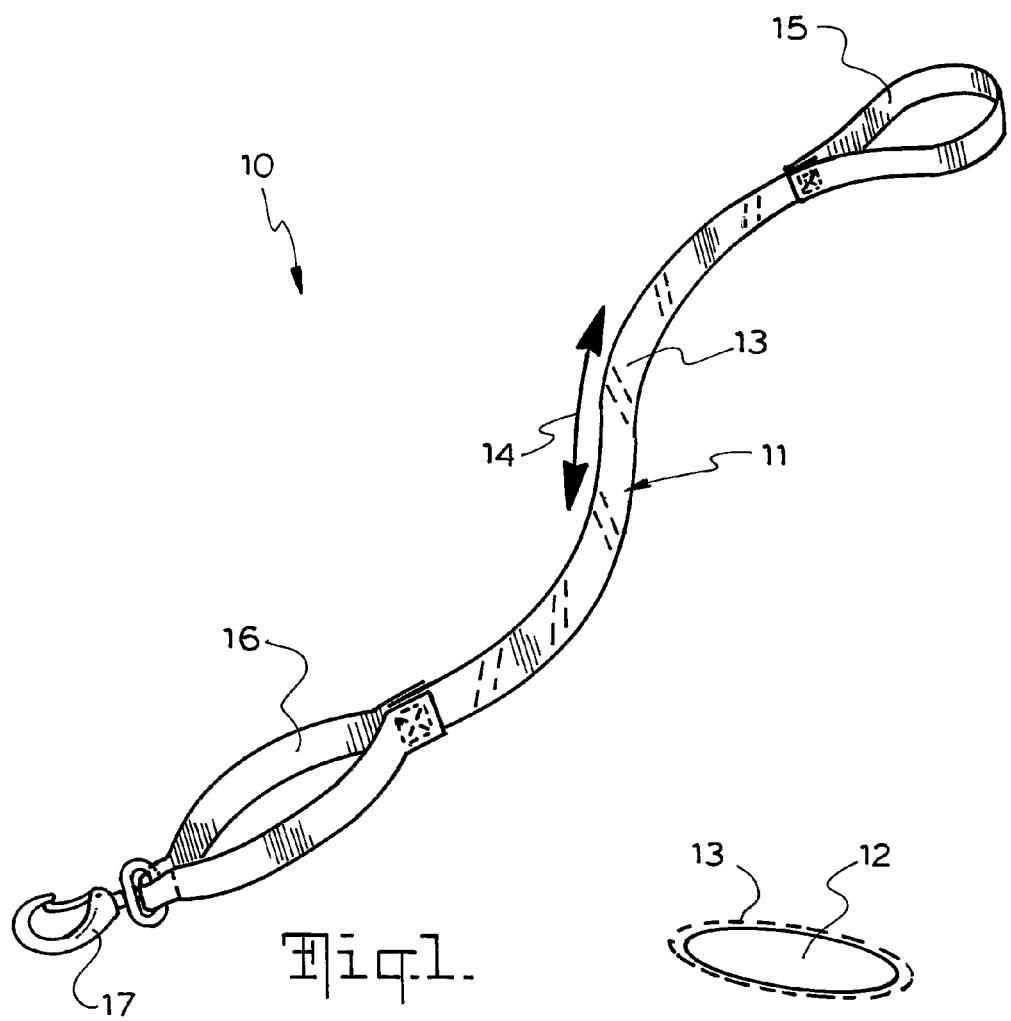
FIG. 1 is a sketch of a leash according to the present invention.
Figure 2:
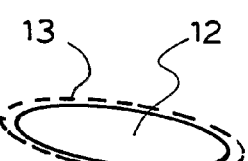
FIG. 2 is a section through the elastic portion of the leash.

Referring to the drawings and initially to FIG. 1, there is illustrated a dog leash 10 comprising an elastic section 11 having an elliptical section elastic material 12 and an outer braiding 13 whereby the braiding is woven so that it may extend in a limited amount in the direction of the arrow 14 and be limited in that extension by reason of the limitation imposed by the weave on the braiding. The braiding is made from inextensible fibres woven cross-wise so that the fabric so formed may extend to the limit imposed by the weave. Thus the elastic section 11 operates principally as a shock absorber in the leash. The leash has an inextensible webbing handle 15 at one end and a close work handle formed as a loop 16 at the opposite end simply sewed together as shown. A snap lock 17 to be attached to a suitable collar is shown illustrated at the end of the leash 10.

It will be appreciated therefore that the close work loop 16 may be utilised to hold a dog in close proximity to an owner whereby in conjunction with a suitable training collar the entire leash including the elastic section 11 may be utilised in an untensioned position during a training exercise and then the lead may be used to apply a correction to a dog as soon as practicable and that correction force will be applied through the leash 11 to the dog and the limited extension of the leash section 11 will enable shock absorption initially, and progressive application of the correction force that will protect the handler and the dog alike.

Figure 3:
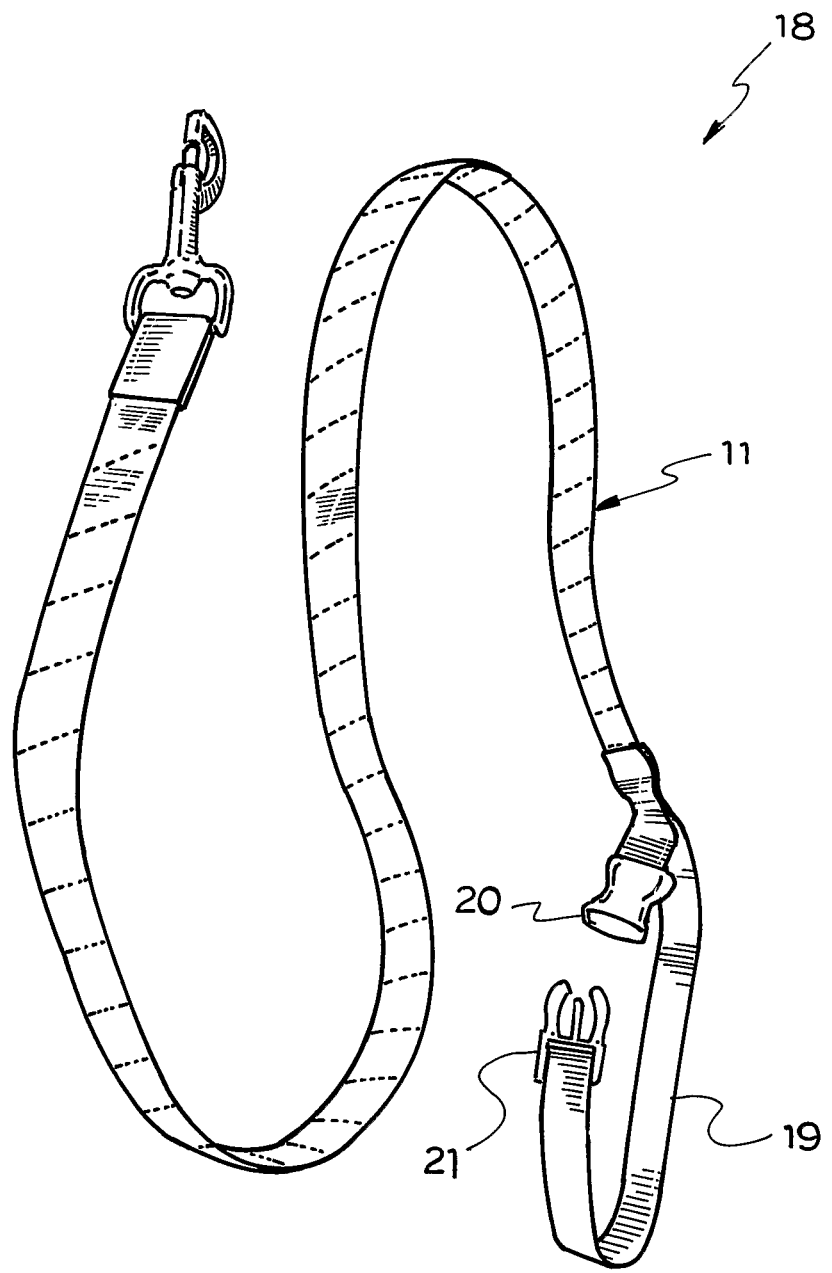
FIG. 3 is a drawing of an alternative embodiment.

Referring to FIG. 3 there is illustrated an alternative embodiment 18 whereby a major portion of the lead comprises the elastic section 11 and a loop 19 includes a side release clip portions 20 and 21 shown open in FIG. 3. In addition, the leash of FIG. 3 omits the close operating loop section 16.

Whilst the above has been given by way of illustrative example of the present invention many variations and modifications thereto will be apparent to those skilled in the art without departing from the broad ambit and scope of the invention as set out in the appended claims.

The invention claimed is:

1. An elastic dog leash having a longitudinal direction of extension, said leash comprising, at least in part, a substantially flat elastic section having a relaxed state, a first length in said relaxed state in said longitudinal direction and two ends, said elastic section also having a cross-section and being extensible in said longitudinal direction of extension from its first length in its relaxed state to a maximum extensible length; and a single layer braided and woven covering web material section surrounding said elastic section; the cross section of the substantially flat elastic section having a perimeter surface and the single layer braided and woven covering web material section being woven as a braid from cross-wise inextensible fibers and having an inner surface following closely the perimeter surface of the substantially flat elastic section along the length of the elastic section; the single layer braided and woven covering web material section having a relaxed length corresponding to the first length of the elastic section in the elastic sections' relaxed state, is secured to said flat elastic section only at locations adjacent the flat elastic section's end, and comprises braiding having a braid weave woven to initially allow the braided and woven covering web material section to extend in length, with the substantially flat elastic section, during extension of the flat elastic section in the longitudinal direction of extension from the braided and woven covering web material sections' relaxed length to a maximum length that is less than the maximum extensible length of the elastic section, said braided and woven covering material section being woven in such a way that length of the braided and woven covering material section between the points at which it is secured adjacent the flat elastic section's end, is allowed to increase, as a result of its braided weave, to its maximum extended length imposed by the weave, and not by the length of the covering material section's inextensible web fibers, so as to limit further extension of the elastic section by reason of the limitation of extension of the single layer braided and woven covering web material engaged with the perimeter of the substantially flat elastic section to said maximum extended length of the covering web material section such that upon application of a correction force to a dog attached to the end of the leash, that correction force is progressively applied and cushioned between the user and the dog as a result of the engagement of the covering web material section with the elastic section.

2. An elastic dog leash according to claim 1 wherein the leash has an elastic section from 1500 mm-2000 mm long.

3. An elastic dog leash according to claim 1 wherein the leash has an elastic section from 1500 mm-1800 mm long.

4. An elastic dog leash according to claim 1 wherein the elastic section is about 15 mm-20 mm wide and 3 mm-5 mm thick.

5. An elastic dog leash according to claim 1 wherein the elastic section is extensible to about 100%.

6. An elastic dog leash according to claim 1 wherein the leash includes a loop handle at a distal end nearest the dog.

7. An elastic dog leash according to claim 1 wherein the leash includes a loop handle at a proximal end nearest the handler.

8. An elastic dog leash according to claim 1 wherein the leash includes a loop handle at a distal end nearest the dog and a second loop handle at a proximal end nearest the handler.

9. An elastic dog leash according to claim 1 wherein the leash includes a loop handle at a distal end nearest the dog and a second loop handle at a proximal end nearest the handler wherein the loop handles are both of inextensible material.

10. An elastic dog leash according to claim 1 wherein the elastic section comprises a slightly medially bulged cross section shock cord and the leash includes webbing loops at each end.

11. An elastic dog leash according to claim 1 wherein the elastic section comprises a section of shock cord covered by said braided and woven covering web material section, the covering web material section being woven to limit extension of the shock cord in said longitudinal direction of extension and wherein the shape and size of the shock cord forms a relatively broad flat lead, the leash having webbing loops at each end, the loops being inextensible webbing forming handles at each end of the shock cord and this webbing comprises flat webbing secured to the shock cord through the braiding.

12. An elastic dog leash according to claim 1 wherein the leash has a distal end and a proximal end and has an elastic section from 1500 mm-2000 mm long, the elastic section being 15 mm-20 mm wide and 3 mm-5 mm thick and is extensible to about twice its unextended length, the leash including a loop handle at the distal end and a loop handle at the proximal end, the loop handles are both of inextensible material and the elastic cord comprises a slightly medially bulged cross section shock cord forming a relatively broad flat lead.

13. An elastic dog leash according to claim 1 wherein the leash has a distal and a proximal end, the leash including a loop handle at the distal end and a loop handle at the proximal end, the loop handles are both of inextensible material and the elastic section comprises elliptical cross section shock cord forming a relatively broad flat lead extending between the two loops, the elastic section having a slightly medially bulged cross section and an outer braiding whereby the braiding is woven so that it may extend a limited amount in the longitudinal direction of the leash and be limited in that extension by reason of the limitation imposed by the weave of the braiding.

* * * * *